United States Patent [19]

Richardson

[11] 4,222,517
[45] Sep. 16, 1980

[54] MAGNETIC MARKER

[75] Inventor: Robert H. Richardson, Melbourne, Fla.

[73] Assignee: Samuel Cornelious Evans, Smyrna, Ga.

[21] Appl. No.: 943,529

[22] Filed: Sep. 18, 1978

[51] Int. Cl.$^2$ ............ G06K 19/06; G08B 13/14; G01D 15/24
[52] U.S. Cl. .................. 235/493; 340/572; 346/135.1; 156/269; 156/302
[58] Field of Search .......... 235/493, 449, 450; 117/44; 346/135; 360/2; 340/280, 572; 101/26

[56] References Cited

U.S. PATENT DOCUMENTS

| | | | |
|---|---|---|---|
| 3,586,593 | 6/1971 | Dahl | 235/493 |
| 3,631,442 | 12/1971 | Fearon | 340/572 |
| 3,746,606 | 7/1973 | Chao | 346/135 |
| 3,765,007 | 10/1973 | Elder | 340/572 |
| 3,820,103 | 6/1974 | Fearon | 340/572 |
| 3,820,104 | 6/1974 | Fearon | 340/572 |
| 3,870,867 | 3/1975 | Hamisch | 101/26 |
| 4,151,405 | 4/1979 | Peterson | 340/572 |

*Primary Examiner*—Robert M. Kilgore
*Attorney, Agent, or Firm*—Richards, Harris & Medlock

[57] ABSTRACT

The present invention relates to an improved magnetic marker and method for manufacturing same. The marker includes a ribbon of magnetic signal material of relatively low coercivity having coupled thereto at least two control elements of a ferro-magnetic material which may be permanently magnetized by a control signal in order to saturate the strip of first ferromagnetic material, thereby preventing the first ferromagnetic material from generating higher order harmonics when interrogated by a periodic magnetic signal of fundamental frequency.

17 Claims, 4 Drawing Figures

MAGNETIC MARKER

BACKGROUND OF THE INVENTION

I. Field of the Invention

The present invention relates to a magnetic marker of the type which may be activated in order to produce a signal of higher order harmonics when placed into an interrogating zone having an alternating magnetic field therein.

II. Description of the Prior Art

Various theft-protection systems have been devised for covertly placing a marker on or within an item to be identified. Typically this marker is composed of a ferromagnetic material which emits a signal of higher order harmonics when excited by a periodic magnetic signal of fundamental frequency. Some of these theft protection systems include on the markers a control element which may be permanently magnetized in order to magnetically saturate the ferromagnetic signal material so as to eliminate the emission of this higher order harmonic signal, such as when the marker is deactivated. The present marker comprises an improvement over the forms of the markers which have been heretofore described in the prior art.

Fearon, in U.S. Pat. No. 3,631,442, discloses a theft detection system which includes a receiving system specifically designed to detect the non-linear signal generated by the ferromagnetic marker having a frequency equal to the difference between the two energizing frequencies. This system uses a relatively large marker having permanent magnets which may activate or deactivate a ferromagnetic base material of relatively low coercivity. As illustrated in FIG. 3 of the Fearon patent, the ferromagnetic marker is relatively large and has a width dimension generally equal to or only slightly larger than its length dimension.

Fearon, in U.S. Pat. No. 3,820,103, discloses a theft detection system of the type with which the marker in accordance with the present invention may be utilized. Fearon, in U.S. Pat. No. 3,820,104, discloses a ferromagnetic marker of the type specifically suitable for use with the system as disclosed in U.S. Pat. No. 3,820,103. This ferromagnetic marker includes a strip of relatively low coercitivy ferromagnetic material which includes a plurality of generally circular apertures therethrough. A strip of generally higher coercivity ferromagnetic material is overlaid along the entire length of the first ferromagnetic material so as to form a plurality of pairs of alternate magnetic poles on the first ferromagnetic element when placed in a predetermined magnetic field, thereby preventing the generation of the higher order harmonic signals. This form of the marker is relatively expensive because large amounts of the first ferromagnetic material and the second ferromagnetic material are required. Furthermore, extensive manufacturing procedures are required to form the circular apertures within the first ferromagnetic material and then to assure that the narrow strip of the second ferromagnetic material is overlaid generally along the center line connecting the circular apertures so as to provide pole spacings between the strip of second ferromagnetic material and the edge of the first ferromagnetic material strip. Fearon, in U.S. Pat. No. 3,790,945, discloses another theft protective electronic system and associated ferromagnetic marker for use therewith.

Various other theft detection systems and ferromagnetic markers are disclosed in the following U.S. Pats.
3,747,086; 3,292,080
3,754,226; 2,520,677
3,665,449; 3,707,672
3,697,996; 3,550,201
3,838,408; 3,423,674
3,493,955; 3,384,892
3,696,379; 3,098,971
3,500,373; 2,774,060
3,292,080; 3,765,007.

Other theft detection and ferromagnetic marker systems are disclosed in French Pat. No. 763,681 published on Mar. 4, 1935, and Canadian Pat. No. 915,780 issued on Nov. 28, 1972.

These United States and foreign patents illustrate the present state of the art upon which the present invention is based. As such, each of these references is hereby incorporated by reference into this specification as if fully set forth herein.

The above prior art references include U.S. Pat. No. 3,765,007 issued to James T. Elder and assigned to the Minnesota Mining and Manufacturing Company. While the illustrations in FIGS. 7 and 8 of this prior art reference disclose markers which are similar in appearance to the present invention, the form of the marker and of the system disclosed by Elder are patentably distinct and different from the present invention in the following respects:

1. Elder envisions a plurality of ferromagnetic elements, each having a different A.C. coercivity such that when subjected to periodically varying magnetic fields, the magnetization of the various elements reverses sequentially. Therefore, each of the elements must have different magnetic and coercivity characteristics so that as the magnetic field increases, one element at a time will change its magnetic state and thereby radiate its identifying signal. See for example Column 2 at lines 9 through 21, Column 4 at lines 1 through 22, Column 8 at lines 41 through 48, and Column 13 at lines 54 through 63. This system, which utilizes elements of different A.C. coercivity, should be contrasted with the present invention which utilizes a single signal element of generally uniform coercivity which relates higher harmonic signals when interrogated with a periodic magnetic signal of fundamental frequency. Therefore, the requirement of a plurality of different signal elements is eliminated with the system envisioned with the present invention.

2. As defined in Column 3, lines 11 through 24 and 59 through 68, Elder envisions the signal element as comprising a flat ferromagnetic ribbon or wire which may include a thin coating of ferromagnetic particles held in an organic binder such as vinyl chloride. This should be contrasted with the present invention which utilizes a signal element composed of a ferromagnetic substance such as permalloy which has a relatively low coercivity ranging from between 0.1 Oersteds and 0.01 Oersteds. These materials are different in that Elder merely requires his signal element to change magnetic states at a threshold coercivity level, whereas the present invention requires an element which emits a higher order harmonic signal when interrogated by or excited by a periodic magnetic signal of fundamental frequency.

3. Elder defines the use of various "control elements" beginning at Column 4 line 23 through Column 6 at line 4. These control elements comprises a remanently magnetizable material which retain a magnetic field when magnetized. This construction in theory is generally the same as in the present invention. However, as described by Elder at Column 4 line 66 through Column 5 line 6, the magnetic poles of the control elements should be aligned parallel to the longitudinal axis of the control element, which in accordance with FIG. 7 is parallel to the longitudinal axis of the signal element and generally perpendicular to the passage of lines of magnetic flux through the signal element. This should be contrasted with the present invention in which the magnetic poles of the magnetized control elements are generally perpendicular to the longitudinal axis of the signal element.

4. Also, at Column 8 lines 41 through 52 of the Elder reference, the control element is described as being composed of a gamma-ferric-oxide strip having generally the same width and length as the signal element. This is contrasted with the present invention in which the control element has the same width but a much shorter length than the signal element.

5. Furthermore, Elder in FIG.8 illustrates a plurality of control elements 282 and 284 which extend only a portion of the open strip signal element 280 (see also Column 14 at lines 3 through 12). While the structure of this marker 274 appears to be similar to the present invention, the use of different materials for the signal element and the control element will produce a radially different electrical response as well as electrical activation and deactivation when compared with the operation of the present invention. The present invention utilizes a control element having a coercivity greater than 100 Oersteds, which is substantially larger than the coercivity envisioned by Elder on his control elements.

These deactivatable marker designs have not been completely satisfactory or accepted in the marketplace for some of the following reasons. First, the deactivatable markers such as disclosed in U.S. Pat. No. 3,820,104, require a large piece of relatively high coercivity type material which makes the marker heavier, stiffer and wider than would be desired. Secondly, the location of the overlay control element is critical for the proper activation and deactivation of the marker. Thirdly, the deactivation of the marker will take place only if the magnetic pole or plane of the control element is oriented parallel with respect to the deactivation magnetic field. This should be contrasted to the present invention in which the magnetic pole of the control elements may be situated either parallel or perpendicular with regard to the deactivation magnetic field. Fourthly, the size of the prior art markers requires a relatively large surface area of both the signal element and the control element, thereby greatly increasing the cost of production of the marker. While this increase in cost is relatively minor on an absolute scale, this cost of production becomes economically prohibitive when the volume of markers produced exceeds several million per year.

SUMMARY OF THE INVENTION

The present invention relates to a magnetic marker for being used with a system which detects the marker within an interrogation zone wherein a magnetic field varies periodically at a predetermined fundamental frequency. This system includes a sensor for actuating a security readout following the detection of a high harmonic frequency of the fundamental frequency which is generated by the magnetic marker.

The magnetic marker includes a signal strip of ferromagnetic material of low coercivity which has a relatively long length as compared to a narrow width. A plurality of control elements of ferromagnetic material of relatively higher coercivity are coupled at intervals along the length of the signal strip. Each of the control elements may be magnetized for magnetically saturating adjacent sections of the signal strip for precluding the radiation of the higher level harmonic frequencies. Each of the control elements has a width generally equal to the width of the signal strip, and the control elements are spaced from each other along the length of the signal strip. A method for manufacturing the magnetic marker is also provided.

BRIEF DESCRIPTION OF THE DRAWINGS

Other objects features and advantages of the present invention will become apparent through a study of the written description and the drawings in which.

DETAILED DESCRIPTION OF THE PREFERRED EMBODIMENT

Figure 2:
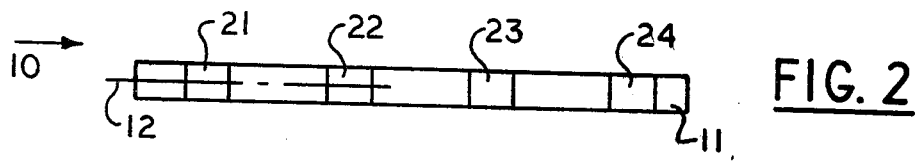
FIG. 2 illustrates a top view elevation of a magnetic marker in accordance with the present invention.
Figure 3:
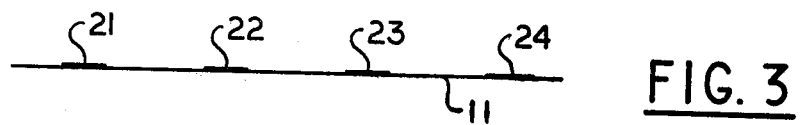
FIG. 3 illustrates a frontal view of the magnetic marker in accordance with the present invention.
Figure 4:
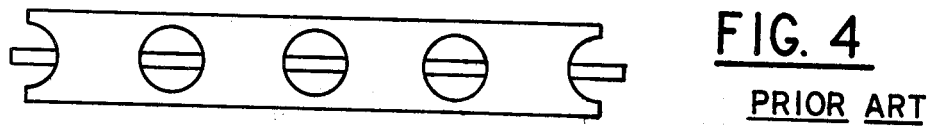
FIG. 4 illustrates the prior art magnetic markers as disclosed by Fearon in U.S. Pat. No. 3,820,103 and 3,820,104.

A first preferred embodiment of the magnetic marker in accordance with the teachings of the present invention is illustrated generally as 10 in FIG. 2. The marker 10 includes a signal strip 11 of ferromagnetic material of known and relatively low coercivity ranging from between 0.1 Oersteds and 0.01 Oersteds. The signal strip 11 is an elongated generally rectangular piece which forms an open strip, that is one which when magnetized has separate poles and is not closed or wound upon itself. The signal strip is selected such that the ferromagnetic particles therein reverse their polar orientation for each sinusoidal alternation of an interrogating magnetic field. Typically the signal strip 11 is placed within the interrogation area such that the major dimension, or longitudinal axis 12, is oriented parallel to the sinusoidally varying magnetic field. Typically this magnetic field has a peak amplitude of approximately 1 Gauss and varies at a frequency between 60 Hz and 10 kHz.

The material used in the sinusoidal strip 11 is typically a conductive ferromagnetic alloy of nickel, molybdenum, manganese and iron. This alloy is commonly referred to as mopermalloy, or simply permalloy. The signal strip 11 is annealed for maximum response with a final coercivity (Hc) of from between 0.01 Oersteds to 0.1 Oersteds, with less than 0.05 Oersteds desired and a Br / Bs ratio of 0.6 to 0.8, with 0.70 being typical. Although not important to the operation of the present invention, the signal strip material chosen herein has a relatively high permeability in the order of 200,000 Gauss/Oersted.

The signal strip 11 has typical dimensions of 0.0007 inches in thickness and 0.125 inches in width. Neither of these dimensions is extremely critical, and these dimensions can easily vary by as much as plus or minus 20 percent with no significant effect on the system operation. The length of the signal strip 11 as measured along its longitudinal axis 12 is typically 3 inches, but this length can vary from less than 2 inches to as much as 7 inches, depending upon the application and space limitations inherent in the article to be marked.

The permalloy signal strip 11 is characterized by a first or unmagnetized state which radiates a harmonic signal when excited with the periodic magnetic signal of the fundamental frequency such as the interrogation signal. While any of these higher order harmonic signals may be received in order to detect the presence of the signal strip 11 in its first condition, the most accepted system design detects the eighteenth to twentieth order harmonics of the fundamental interrogation frequency. In a second or magnetized state the permalloy signal strip 11 is characterized as not radiating the harmonic signals when excited, or at least radiating a signal substantially different in haromonic content from the signal typically radiated when in the first state.

With continuing referene to FIG. 2, the permalloy signal strip 11 also includes thereon a plurality of control elements, 21, 22, 23 and 24, which ar separated from each other and coupled along the length of the signal strip 11. These control elements, which will be referred to generally as 20, are formed from a ferromagnetic material with a coercivity at least 500 and preferably 1,000 times greater than the relatively low coercivity of the signal strip 11. It is recommended that the minimum coercivity be at least 100 Oersteds, with 150 to 250 Oersteds being preferred. Th remenance (Br) of the control elements 20 should be at least 5,000 Gauss, with a preferred range of from between 8,000 to 12,000 Gauss. The control elements 20 are typically formed of an alloy of cobalt, vanadium and iron, with the alloy commonly known as vicalloy.

The width of the control elements 20, that is the dimension perpendicular to the longitudinal axis 12 of the signal strip 11, is generally equal to the width of the signal strip 11. Typically the dimensions of the control elements 20 are 0.125 inches in width, by 0.150 inches in length, and 0.002 inches in thickness. Research indicates that there is a minimum size below which the control elements 20 will not properly function in conjunction with the signal strip 11. This minimum size is typically $0.150 \times 0.125 \times 0.002$ inches. Control elements 20 of larger sizes will work with equal efficiency, but the increased cost of materials as well as the functional size limitations of the total marker 10 make the larger sized control elements 20 both functionally and economically less attractive.

When the control elements 20 are not magnetized, the signal strip 11 will radiate the signals of higher level haromonics when interrogated with the magnetic field of fundamental frequency. The control elements 20 will not typically interfere with this function. The primary function of the control elements 20 is to magnetically lock the signal strip 11 into its second or magnetized condition which is characterized with the absence or at least a significant change in the higher haromonic signals when interrogated with the signal of fundamental frequency. The control elements 20 become permanently magnetized with poles which are generally adjacent the width edges of the control elements 20 and the signal strip 11. The lines of magnetic flux which communicate between the poles of the control elements 20 will hold the ferromagnetic materials in the adjacent sections of the signal strip 11 in proper alignment which is generally perpendicular to the longitudinal axis 12 therethrough even in the presence of a strong interrogation signal. The remenance of the control elements 20 will not allow the ferromagnetic elements in the signal strip 11 to reverse responsive to the magnetic interrogation signal. Therefore, the remenance of the control elements 20 at points measured some distance from the elements themselves should be large enough to effectively magnetize or saturate the ferrogmagnetic elements in the signal strip 11.

It should be noted that the interrogation magnetic signal is not sufficiently large enough to cause the permanent magnetization of the contrl elements. Instead, the interrogation signal is substantially lower in intensity but large enough to excite the higher harmonic signals radiated by the signal strip 11 when interrogated. In contrast, the control elements 20 are magnetized by applying a relatively large DC magnetic field to the area of the marker. Typically this magnetic field is and the order of 250 Oersteds. This strong magnetic field will magnetize the control elements in the remanent magnetization of the control elements 20 will thereby desensitize the signal strip 11. Other conventional techniques may be employed to magnetize and demagnetize the control elements 20. These techniques are discussed in Column 5 of U.S. Pat. No. 3,765,007.

The control elements 20 are spaced from each other by a distance determined by the remenance of the material used therefore. In the first preferred embodiment of the present invention this separation distance is approximately 0.125 inches, with this distance being chosen so as to magnetically saturate the ferromagnetic elements present in the sections of the signal strip 11 between the control elements 20.

Figure 1:
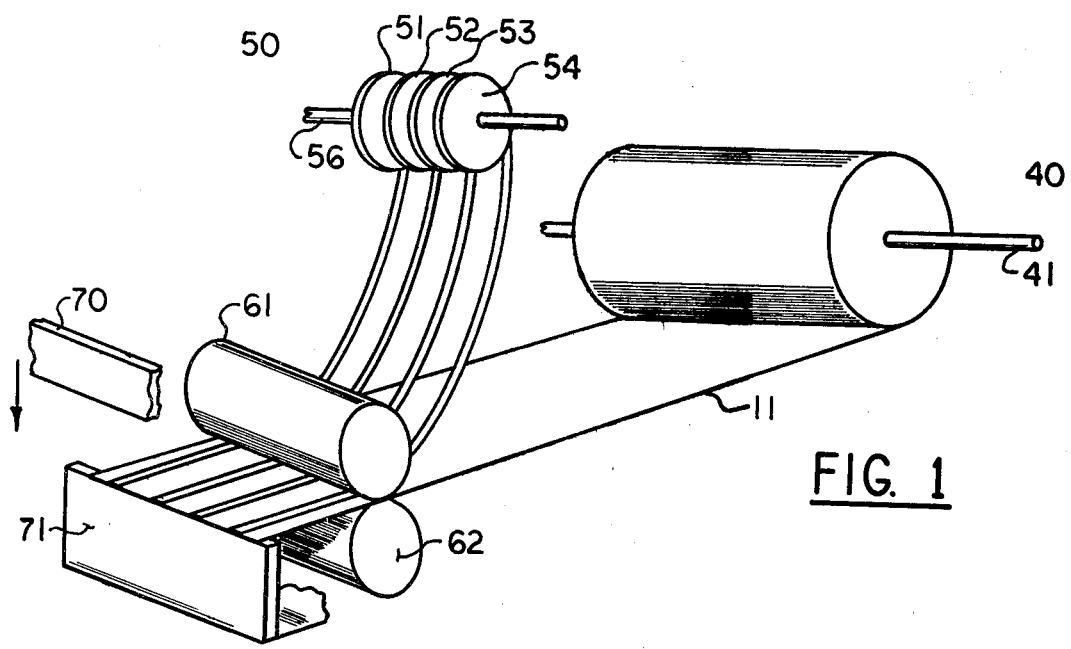
FIG. 1 illustrates a roll of the ribbon comprising the signal magnetic material to which is being applied a plurality of strips of the control ferromagnetic material.

As illustrated generally in FIG. 1, the cost of producing the magnetic markers 10 may be substantially reduced by forming a long continuous ribbon with the constituent elements and then cutting the width of the ribbon so as to form the elongated shape of the magnetic marker 10. Typically, a roll of the signal strip ribbon 11 is freely rotatable about a shaft 41 so as to unroll the wide ribbon forming the signal strip 11. A plurality of rolls 51, 52, 53 and 54 of the second ferromagnetic material comprising the control elements are each movably coupled about a shaft 56 so as to form an integral unit 50. Proper spacing between each of the rolls 51, 52, 53 and 54 must be maintained in order that the strips of the second ferromagnetic material will unroll onto the upper surface of the signal strip ribbon 11 with proper spacing therebetween. The strips of the control element substance are then sealed into close communication with the upper surface of the signal strip ribbon 11 by the operation of two compressed roller wheels 61 and 62. These roller wheels 61 and 62 pull the control element strips and the signal strip ribbon therethrough and eject the finished marker ribbon at the opposite side thereof. Depending on the type of materials utilized for the signal strip ribbon and the control strips, it may be possible to utilize a nonmagnetic adhesive material for securing the elements together. Also, a paper or other nonmagnetic backing material may be applied to the underside of the signal ribbon 11 so as to allow it to adhere to the item to be marked.

After the elements have been combined to form the marker ribbon, the ribbon may be advanced through an automatic cutter, shown diagramatically as 70 and 71 in FIG. 1, which will cut or shear the magnetic marker ribbon along a direction generally perpendicular to a longitudinal axis of a signal strip ribbon 11, which is generally perpendicular to the longitudinal axis 12 of the magnetic marker 10. After the first cut has been made, the rollers 61 and 62 may be incrementally advanced so to as insert the desired width of the marker ribbon 11 through the cutter and then the cutter may be again actuated to produce still another one of the magnetic markers 10. It will be apparent from this procedure that the process of making a large number of substantially uniform magnetic markers may be enhanced by utilizing materials which are contained upon rolls which are then unwound in the process of affixing the control elements strips to the signal strip ribbon.

Thus, a first preferred embodiment of the magnetic marker in accordance with the present invention and a method for making same have been illustrated as an example of the invention as claimed. However, the present invention should not be limited in its application to the details illustrated in the accompanying drawings of the specifications, since this invention may be practiced and constructed in a variety of different embodiments. Also, it must be understood that the terminology and descriptions employed herein are used solely for the purpose of describing the construction and general operation of the preferred embodiment, and therefore should not be construed as limitations on the operability of the invention.

I claim:

1. A method of manufacturing an elongated marker formed of a first ferromagnetic material which is capable of generating harmonic frequencies when interrogated with a magnetic field of fundamental frequency, and a second ferromagnetic material which controls the state of the first material for enabling or disabling the harmonic signal when interrogated, said method of manufacture comprising the steps of:
   A. Positioning at least two elongated relatively narrow strips of the second material generally parallel with the longitudinal axis of a relatively wide ribbon of the first material;
   B. coupling said elongated strips of the second material to said ribbon of the first material; and
   C. cutting said ribbon of the first material, and said strips of the second material coupled thereto, generally adjacent an end thereof and across said longitudinal axis, thereby forming the elongated ferromagnetic marker from a narrow section of the width of said ribbon of said first material.

2. The method of manufacturing the elongated ferromagnetic marker as described in claim 1 further including the additional steps of:
   D. incrementally advancing said ribbon of said first material in a direction along said longitudinal axis thereof by a distance generally equal to the desired width of said elongated ferromagnetic marker; and
   E. repeating steps C, D and E.

3. The method of manufacturing the elongated ferromagnetic marker as described in claim 2 further including the substep of:
   B1. maintaining predetermined spacings between said strips of said second material as they are coupled to said ribbon of said first material.

4. The method of manufacturing the elongated ferromagnetic marker as described in claim 3 further including the substep of:
   B2. maintaining said predetermined spacings between said strips of said second material to at least the separation equal to the width of one of said strips of said second material.

5. The method of manufacturing the elongated ferromagnetic marker as described in claim 2 wherein step A includes the substep of:
   A1. spacing said elongated strips of said second material generally parallel with each other.

6. The method of manufacturing the elongated ferromagnetic marker as described in claim 5 further including the substep of:
   C1. orienting the cutting across said ribbon of said first material so as to be generally perpendicular to said longitudinal axis of said ribbon.

7. The method of manufacturing the elongated ferromagnetic marker as described in claim 6 wherein step B includes the substep of bonding said second material to said first material.

8. The method of manufacturing the elongated ferromagnetic marker as described in claim 7 further including the preliminary step of orienting the magnetic poles of said strips of said second material generally parallel with said longitudinal axis of said ribbon of said first material.

9. The method of manufacturing the elongated ferromagnetic marker as described in claim 2 wherein said first material has a coercivity in the range between 0.01 and 0.1 Oersteds and said second material has a coercivity in the range between 100 and 2,500 Oersteds.

10. The method of manufacturing the elongated ferromagnetic marker as described in claim 9 wherein said first material is permalloy and said second material is vicalloy.

11. A signal generating marker for being used in a system which detects the marker within an interrogation zone wherein a magnetic field varies periodically at a predetermined fundamental frequency, with the system including a sensor for actuating a security readout following the detection of a high harmonic frequency as generated by the marker responsive to the interrogation by the fundamental frequency, said marker comprising in combination:
   a signal strip of ferromagnetic material of low coercivity and having a relatively long length as compared to a relatively narrow width, said signal strip having a first state characterized as unmagnetized for radiating harmonic signals when interrogated with the periodic magnetic signal of fundamental frequency, and a second state characterized as not radiating said harmonic signal when interrogated; and
   a plurality of control elements of ferromagnetic material of relatively higher coercivity for being operatively coupled at intervals along said signal strip, with each of said control elements having a first unmagnetized state for switching adjacent sections of said signal strip into said first state, and having a second magnetized state for switching adjacent sections of said signal strip into said second state, with each of said control elements having a narrow width generally equal to said narrow width of said signal strip.

12. The signal generating marker as described in claim 11 wherein said low coercivity of said signal strip is in the range from between 0.01 Oersteds and 0.1 Oersteds, and wherein said higher coercivity of said control elements is in the range from between 100 Oersteds and 2,500 Oersteds.

13. The signal generating marker as described in claim 11 wherein and said low coercivity of said signal strip is at least 500 times less than said higher coercivity of said control elements.

14. The signal generating marker as described in claim 13 wherein the width edges of said control elements are oriented generally coincident with the width edges of said signal strip.

15. The signal generating marker as described in claim 14 wherein the magnetized poles of each of said control elements when in said second magnetized state are generally adjacent said width edges of said signal strip.

16. The signal generating marker as described in claim 15 wherein said length of each of said control elements is less than said width thereof.

17. A method for detecting the presence of a sensitized marker in an interrogation zone while omitting detection of a desensitized marker present in said zone, comprising the steps of:

(a) generating an alternating electromagnetic field in said zone to cause a unitary signal strip of ferromagnetic material located within said zone to radiate harmonic signals of said electromagnetic field, said marker having the length dimension thereof substantially greater than the width dimension thereof, (b) detecting at least one of said harmonic signals radiated by said signal strip to indicate the presence of said marker within said interrogation zone, (c) densensitizing said marker by magnetizing a plurality of control elements of ferromagnetic material, said control elements joined to said signal strip at spaced apart positions, having a length dimension less than the length of said signal strip and a width dimension approximately the same as the width of said signal strip, and said control elements having a greater coercivity than said signal strip, wherein the desensitized marker radiates said harmonic signals with a lesser amplitude when located within said electromagnetic field, and (d) sensitizing said marker by demagnetizing said control elements to permit said marker to generate said harmonic signals when said marker is located within said electromagnetic field.

* * * * *